United States Patent [19]

Unger

[11] Patent Number: 5,430,077
[45] Date of Patent: Jul. 4, 1995

[54] METHOD FOR CONTINUOUSLY PREPARING THERMO-CROSSLINKABLE AND/OR THERMOPLASTIC ELASTOMER BLENDS

[75] Inventor: Jacques Unger, Zofingen, Switzerland

[73] Assignee: Gezolan AG, Dagmersellen, Switzerland

[21] Appl. No.: 959,998

[22] Filed: Oct. 13, 1992

[30] Foreign Application Priority Data

Oct. 21, 1991 [DE] Germany .................. 41 34 682.3

[51] Int. Cl.⁶ ................................................ C08J 3/20
[52] U.S. Cl. .................................... 523/351; 524/484; 524/485; 524/486; 524/490; 524/491
[58] Field of Search .............. 523/351; 524/484, 485, 524/486, 490, 491

[56] References Cited

U.S. PATENT DOCUMENTS

| | | | |
|---|---|---|---|
| 2,333,786 | 11/1943 | Hessen | 523/324 |
| 3,007,885 | 11/1961 | Oldham et al. | 523/324 |
| 4,001,172 | 1/1977 | Steinkamp et al. | 523/351 |
| 4,161,419 | 7/1979 | Alia | 523/351 |
| 4,321,168 | 3/1982 | Ueda et al. | 523/353 |
| 4,357,432 | 11/1982 | Edwards | 523/351 |
| 4,737,561 | 4/1988 | Stary et al. | 523/353 |
| 4,773,624 | 9/1988 | Affenzeller et al. | 523/351 |
| 4,774,227 | 9/1988 | Janac et al. | 523/351 |

*Primary Examiner*—Paul R. Michl
*Assistant Examiner*—Edward Cain
*Attorney, Agent, or Firm*—Tarolli, Sundheim & Covell

[57] ABSTRACT

A method method for continuously preparing thermo-crosslinkable and/or thermoplastic elastomer blends by mixing the powdered or granulated elastomer with plasticizer oil and other additives, said method comprising the steps of:

(a) continuously premixing said elastomer in a premixer with at least part of said plasticizer oil, and optionally with at least part of said other additives, to form a preblend in which said elastomer is decomposed and said additives are embedded in the polymer matrix;

and thereafter (b) continuously completing the mixing of said premix, and optionally of the remainder of said additives in a mixing extruder.

22 Claims, No Drawings

METHOD FOR CONTINUOUSLY PREPARING THERMO-CROSSLINKABLE AND/OR THERMOPLASTIC ELASTOMER BLENDS

TECHNICAL FIELD

This invention relates to a method for continuously preparing thermo-crosslinkable and/or thermoplastic elastomer blends.

"Thermoplastic elastomers (TPE)" is the generally accepted designation for materials in which the elastomeric phases (as soft component) are embedded in plastic material (as hard component). Depending on the nature of this embedding one distingishes between block copolymers and polyblends.

Furthermore, the thermoplastic elastomers may be classified as follows:
1 Types having high hardness
1.1 Copolyesters
1.2 Polyether block amides
2 Types having low hardness
2.1 Thermoplastic polyurethanes (TPU)
2.1.1 Polyetherurethanes
2.1.2 Polyesterurethanes
2.2 Thermoplastic polyolefins (TPO)
2.2.1 Ethylene-propylene-diene elastomer/polypropylene (EPDM/PP)
2.2.2 Acrylonitrile-butadiene copolymer/polypropylene (NBR/PP)
2.3 Styrene block copolymers
2.3.1 Styrene-butadiene-styrene triblock copolymer (SBS)
2.3.2 Styrene-ethylene/butylene-styrene triblock copolymer (SEBS).

BACKGROUND OF THE INVENTION

So far, the preparation of thermo-crosslinkable and/or thermoplastic elastomer blends, in particular of vulcanizable rubber blends, was generally effected, either:
(a) on a two-roll calender;
or preferably
(b) in an internal mixer.

In variant (a), the calender comprised two parallel, horizontally mounted heatable and coolable hollow rolls. For carrying out mixing, the crude rubber was put onto the rolls in the form of coarse pieces, and was worked until a smooth sheet was obtained. Thereafter, the processing and vulcanization adjuvants were batchwisely added, and the rolled sheet were repeatedly homogenized by cutting and finally cooled with water in order to prevent them from prematurely vulcanizing.

The internal mixer according to variant (b) comprised a closed mixing chamber and two heatable and coolable mixing paddles arranged in said mixing chamber. This feature did provide, it is true, a higher mixing speed and a more intensive mixing effect than variant (a). However, due to the applied speed of rotation, the crude rubber blend in the internal mixer was so strongly heated that no crosslinking reagents could be added. Therefore, it was often necessary either to arrange a calender downstream of said internal mixer and to add sulfur and accelerators to the crude blend removed from the internal mixer on said calender only;

or alternatively to prepare a preblend without sulfur and accelerator in a first mixing passage through said interior mixer, and thereafter to prepare the final blend with addition of sulfur and accelerator in a second mixing passage through said interior mixer.

Besides the effectiveness of the mixing aggregate, the order and the moment of addition of the adjuvants have a decisive influence on the elastomer quality. Thus, it was necessary to first add difficultly mixable plasticizers which do not initiate crosslinking, and to add vulcanizing agents at the end only.

So far, the attempts for achieving a continuous mixing in mixing extruders failed for the abovementioned compulsion of observing this order. Calculations show that a spindle length of the order of 40° D would be necessary (D being the spindle diameter). This is technically difficult to realize and economically unattractive.

Furthermore, the use of plasticized elastomers or the addition of large quantities of plasticizers was critical since the shearing forces produceable in the mixture were no longer sufficient for a regular mixing.

OBJECTS OF THE INVENTION

It is a primary object of the present invention is to provide a method for continuously preparing thermo-crosslinkable and/or thermoplastic elastomer blends which avoids the abovementioned disadvantages of the prior art.

It is a further object of the invention too provide a method for continuously preparing thermo-crosslinkable and/or thermoplastic elastomer blends, in particular of vulcanizable rubber blends, which allows using simple mixers or mixing extruders.

SUMMARY OF THE INVENTION

To meet these and other objects, the present invention provides a method for continuously preparing thermo-crosslinkable and/or thermoplastic elastomer blends by mixing the powdered or granulated elastomer with plasticizer oil and other additives, said method comprising the steps (a) continuously premixing said elastomer in a premixer with at least part of said plasticizer oil, and optionally with at least part of said other additives, to form a preblend in which said elastomer is decomposed and said additives are embedded in the polymer matrix;

and thereafter (b) continuously completing the mixing of said premix, and optionally of the remainder of said additives in a mixing extruder.

In the method according to the invention, said premixer of said first step (a) has the function of decomposing the elastomer to such an extent that a mixing with the adjuvants becomes possible. Thus a large part of the total mixing process is effected in said premixer, whereas the function of said mixing extruder is reduced to a simple aftermixing. This was most surprising to a person skilled in the art.

DESCRIPTION OF THE PREFERRED EMBODIMENTS

In applying the method according to the invention, all known groups of adjuvants can be used, that is to say:

1 Crosslinking systems, in particular vulcanization agents.

2 Fillers, namely:

2.1 Active fillers which result in a decisive improvement of the mechanical properties, particularly of the tensile strength and the abrasion resistance, such as: types of active black carbon, aluminium and calcium silicate, and zinc oxide; or 2.2 Inactive fillers which do not result in a quantitative improvement of the vulcanized goods, for example calcium and magnesium carbonate, kaolin, barite, kieselguhr, and various clays;

2.3 For elastomers which are not filled with carbon black: dyes, namely:

2.3.1 Inorganic pigments, for example lithopone, titanium dioxide, iron oxide, and chrome oxide green; or 2.3.2 Organic dyes, for example azo, alizarin and phthalocyanine dyes.

3 Plasticizers for improving the processing properties, the elasticity, and the cold-behavior, namely:

3.1 For non-polar or weakly polar crude rubber types (for example natural rubber (NR), styrene-butadiene copolymers (SBR), polybutadiene (BR), isobutylene-isoprene copolymers (IIR)): mineral oil products.

3.2 For more polar types (for example acrylonitrile-butadiene copolymer (NBR) and polychlorobutadiene (CR)): phthalates (for example dibutyl and dioctylphthalate), phosphoric esters (for example tricresyl phosphate), and aromatic mineral oils.

3.3 Further processing adjuvants, for example factices (i.e vegetable oils treated with sulfur or sulfur chloride), lanoline, soft paraffin, soft polyethylene, bitumen, and pitch.

4 Age protectors for improving the resistance of the finished vulcanized good against oxygen, the action of light, and dynamic strain, namely:

4.1 For protecting elastomers the macromolecules of which contain double bonds against oxygen and ozone: antioxidants, for example amines and phenols;

4.2 Screening agents, in particular paraffinic substances, for example ceresin and ozocerite;

4.3 For retarding the hydrolysis of elastomers having the tendency to hydrolyze (for example polyurethane elastomers (PU) and ethylene-vinylacetate copolymers (EVA): polycarbodiimine.

5 Other adjuvants, namely:

5.1 Agent for influencing the stickiness, namely:

5.1.1 Agents for reducing the undesired adherence of the crude rubber during its processing, for example paraffin, lanoline, stearic acid and its salts;

5.1.2 Agents for improving the stickiness of the crude rubber during its assembly, for example colophonium, coumarone resins, alkylphenol acetylene condensates, as well as low-molecular polyethylenes.

5.2 Adhesives which are necessary for manufacturing firm joints between elastomers and metals, as well as compound materials with fabrics, for example in the tire production and for conveyor belts, namely:

5.2.1 For manufacturing metallic compound materials: for example cobalt naphthenate, recorcin resin, as well as increased quantities of sulfur;

5.2.2 For manufacturing textile compound materials: for example styrene-butadiene-vinylpyridine terpolymers in combination with resorcinol formaldehyde resins and special isocyanates.

5.3 Foaming agents for the manufacturing of porous vulcanized goods, for example sulfohydrazides (such as benzenesulfohydrazide), nitroso compounds (such as dinitrosopentamethylenetetramine and am- monium carbonate.

As a general rule, the adjuvants can be used with the commercial grain sizes in the my-range. Their use in paste form provides the possibility of refining them, in particular to pulverize, to disperse or to degas them. This makes it possible to use coarse-grinded and therefore less expensive adjuvants, for example black carbons.

In carrying out the method of the invention, at least part of said plasticizer oil and at least part of said other additives may be converted into one or several pastes which are introduced into said premixer of said first step (a).

If pastes are to be prepared from said adjuvants, it is obviously necessary that the quantity of liquid adjuvants, and in particular of plasticizer oil, be high enough.

A single paste may be produced from all additives, said single paste being then introduced into said premixer of said first step (a).

Alternatively, said additives may be shared for preparing several pastes, preferably two pastes, which are then introduced into said premixer of said first step (a), either separately or after being mixed together.

If said adjuvants are to be converted into a paste or pastes, respectively, the quantity of liquid ingredients, in particular that of the plasticizer oil, should obviously be high enough for allowing the effective forming of a paste or of pastes, respectively.

Preferably, groups of adjuvants which remain unchanged for different applications are combined into one paste. For example, when working with two pastes, one of them may colour-neutral and the other paste may be coloured. In this way it is possible to use the colour-neutral paste for the manufacturing of differently coloured elastomer mixtures, so that only the coloured paste is to be adapted to the desired colouring.

Said single paste or said pastes, respectively, may be refined before being introduced into said premixer of said first step (a), in particular by pulverization, by dispersing, or by degasification.

Since homogenous mixing of the various ingredients is the easier the quantities of the various adjuvants are equal, it is advisable to prepare first a prepaste of those adjuvants which are needed in relatively small quantities only, and to mix said prepaste with the other paste or pastes, respectively, before mixing it with the elastomer.

Alternatively, part of the additives, which are in powdered form, may be directly introduced into said premixer of said first step (a) and/or part of the additives, which are in powdered or paste form, may be directly introduced into said mixing extruder of said second step (b). The latter is particularly useful if mixtures, for example tire mixtures, are to be prepared in which the quantity of plasticizer is relatively small as compared with that of the the fillers.

Preferably, a continuously working high speed turbomixer is used as premixer, said turbomixer working for example at 2000 r.p.m (revolutions per minute), and in particular a annular zone mixer. As it is generally known, this mixing device has a shaft provided with teeth which rotates with high speed inside a smooth tube. Thereby, a turbulent annular zone is produced near the wall of the tube. The decomposition of the elastomer and its mixing with the other ingredients is essentially effected exclusively in this zone, due to the high frictional forces produced by said turbulence.

The method according to the invention may be used for preparing crosslinkable and/or thermoplastic elastomer blends form all crosslinkable or thermoplastic elastomers, and in particular from:
  natural rubber (NR),
  synthetic cis-1,4-polyisoprene (IR),
  cis-1,4-polybutadiene (BR),
  styrene-butadiene copolymer (SBR),
  acrylonitrile-butadiene copolymers (NBR),
  poly-2-chlorobutadiene (CR),
  isobutylene-isoprene copolymers (IIR),
  ethylene-propylene-dien terpolymers (EPDM),
  ethylene-propylene copolymers (EPM),
  ethylene-vinylacetate copolymers (EVA),
  polyurethane elastomers (PU),
  polysulfide elastomer (PSR),
  polyacrylate elastomers (AR),
  polyepichlorohydrin elastomers (CHR),
  sulfochlorinated polyethylene (CSM),
  fluorocarbon elastomers (FE),
  silicone elastomers (SIR),
  1,5-trans-polypentenamers (TPR),
  ethylene-proyplene-dien elastomer/polyproylene polyblend (EPDM/PP),
  acrylonitrile-butadien-copolymer/polypropylene polyblend (NBR/PP),
  styrene-butadiene-styrene triblock copolymer (SBS),
  styrene-ethylene/butaylene-styrene triblock copolymer (SEBS).

For preparing commercial semifinished products, the resulting mixture is preferably continuously pelleted after the mixing procedure. Preferably, the obtained pellets, depending of the intended use, are either immediately:
  continuously heated in order to vulcanize or crosslink them, respectively;
or
  continuously cooled in order to prevent them from vulcanization or crosslinking, respectively.

Alternatively, the elastomer mixture coming out from the mixing extruder may be directly subject to its final shaping procedure, for example in an extruder or on a calender.

The method according to the invention shows a number of outstanding advantages, as compared with the status of the art, namely:

The admixing of the adjuvants is extremely simple and energy-saving.

The mixing extruder necessary for completing the mixing procedure, i.e. an extruder comprising a mixing zone, can be of simple and light construction, due to the fact that only a low speed of rotation, for example 100 r.p.m. (revolutions per minute), is necessary. A spindle length of 12° D to 18° D is quite sufficient. Such mixing extruders have a very high throughput, as compared with the vulcanization devices according to the status of the art.

At the same time, the mixing is extremely energy-saving, since the elastomer is already present in the form of a powder or a granulate and does not need to be rendered flowable or kneadable by the application of heat. Accordingly, the mechanical overdimensioning of the mixing device, which was so far necessary, is dropped.

The present problem of a subsequent treatment owing to bubble formation does no longer exist, a short degasification segment being just sufficient. A typical mixing extruder may, for example, comprise the following segments:

| | |
|---|---|
| Addition of materials (premix + eventual powders): | 2·D |
| Mixing: | 4·D |
| Degasification: | 4·D |
| Mixing: | 4·D |
| Total length: | 14·D |

The elastomers used can—per se—be unplasticized. This not only facilitates their pulverization or granulation, respectively, but also avoids the situation where, due to insufficient shearing forces, an effective mixing is no longer possible.

From the point of view of industrial hygiene, it is important that a dust-free working is possible both at the premixer and at the mixing extruder.

PREPARATION OF THE BLENDS FOR EXAMPLES 1 TO 3

Three vulcanizable rubber blends were prepared form the following ingredients in the manner described hereafter. The "parts" referred to are parts by weight.

| No. | Component | Parts | Parts |
|---|---|---|---|
| 1 | BUNA AP 447[1] | | 100.0 |
| 2 | Zinc oxide RS | | 5.0 |
| | 3.1 Stearic acid | 1.0 | |
| | 3.2 Stearic acid | 1.0 | |
| 3 | Total stearic acid | | 2.0 |
| 4 | Chalk | | 250.0 |
| | 5.1 Paraffinic/naphthenic mineral oil | 70.0 | |
| | 5.2 Paraffinic/naphthenic mineral oil | 10.0 | |
| 5 | Total paraffinic/naphthenic mineral oil | | 80.0 |
| 6 | Iron oxide red | | 6.0 |
| 7 | Sulfur | | 7.0 |
| 8 | VULCACIT CZ[2] | | 1.0 |
| 9 | VULCACIT LDA[3] | | 1.0 |
| 10 | VULCACIT Thiuram[4] | | 0.4 |
| | Total | | 452.4 |

[1] EPDM = ethylene-propylene-dien terpolymer - grain size smaller than 10 mm
[2] CPS = benzodiacetyl-2-cyclohexyl sulfenamide
[3] ZDEC = zinc N-diethyl thiocarbamate
[4] TMTB = tetramethyl thiuramdisulfide

EXAMPLE 1

All adjuvants (Nos. 2, 3, 4, 5, 6, 7, 8, 9 and 10) were mixed to from one single paste. This paste, if desired after homogenization, was premixed with the elastomer (No. 1) in an annular zone mixer, the elastomer thereby being decomposed. The resulting premix was then introduced into the material feed sector of a mixing extruder.

EXAMPLE 2

The adjuvants Nos. 2, 3.1, 4, 5.1, 7, 8, 9 and 10 were mixed to form a colour-neutral paste, and the adjuvants Nos. 3.2, 5.2 and 6 were mixed to form a coloured paste. These pastes, if desired after homogenization, were premixed with the elastomer (No. 1) in an annular zone mixer, the elastomer thereby being decomposed. The resulting premix was then introduced into the material feed sector of a mixing extruder.

EXAMPLE 3

The adjuvants Nos. 2, 3, 7, 8, 9 and 10 were premixed to form a prepaste, and the adjuvants Nos. 4, 5 and 6 were mixed to form a main paste. Then, the two pastes were combined. The combined single paste, if desired after homogenization, was premixed with the elastomer (No. 1) in an annular zone mixer, the elastomer thereby being decomposed. The resulting premix was then introduced into the material feed sector of a mixing extruder.

EXAMPLE 4

A typical tire mixture was prepared from the following ingredients, the "parts" referred to being again parts by weight:

| | | |
|---|---|---|
| 100 parts | rubber | |
| 10 parts | plasticizer oil | |
| 60 to 80 parts | carbon black | |
| 8 to 10 parts | other adjuvants (including sulfur). | |

The rubber, the plasticizer oil and the other adjuvants were continuously premixed in an annular zone mixer rotating at 2000 r.p.m. (revolutions per minute). The resulting blend and the carbon black were then introduced into a vulcanization extruder. There, the elastomer blend was completed.

What is claimed is:

1. A method for continuously preparing mixtures comprising at least one thermo-crosslinkable and/or thermoplastic elastomer and a plasticizer oil, said method comprising the steps of:
   (a) providing premix ingredients comprising:
      (i) said elastomer in particulate form;
      (ii) at least one additive for said elastomer;
      (iii) at least part of said plasticizer oil in liquid form;
   (b) continuously introducing said premix ingredients into a continuously working turbulent mixer;
   (c) continuously forming a premix of said premix ingredients by operating said turbulent mixer at a high speed which subjects said premix ingredients to high turbulence and frictional forces produced by said turbulence, the duration of operation of the turbulent mixer and the amount of said plasticizer oil in liquid form being effective to decompose the elastomer and to embed said at least one additive into the polymer matrix of said particulate elastomer;
   (d) continuously subjecting said premix to completion of mixing in a mixing extruder.

2. The method of claim 1, wherein at least part of said plasticizer oil and at least part of the other additives are converted into one or several pastes, said paste or pastes, respectively, being introduced into said turbulent mixer of said step (c).

3. The method of claim 2 wherein a single paste is prepared from all additives, said single paste being introduced into said turbulent mixer of said step (c).

4. The method of claim 2 wherein said additives are formed into several pastes which then are introduced into said turbulent mixer of said step (c).

5. The method of claim 4 wherein two pastes are prepared.

6. The method of claim 5 wherein one paste is colour-neutral and the other paste is coloured.

7. The method of claim 3 wherein said paste is refined before being introduced into said turbulent mixer of said step (c).

8. The method of claim 7 wherein said paste is refined by pulverization, by dispersing, or by degasification.

9. The method of claim 4 wherein said pastes are refined before being introduced into said turbulent mixer of said step (c).

10. The method of claim 9 wherein said pastes are refined by pulverization, by dispersing, or by degasification.

11. The method of claim 4 wherein said pastes are separately introduced into said turbulent mixer of said step (c).

12. The method of claim 4 wherein part of said additives are combined to form a prepaste which is mixed with at least one of the other pastes before being introduced into said turbulent mixer of said step (c).

13. The method of claim 1 wherein part of said additives, in powder form, is directly introduced into said turbulent mixer of said step (c).

14. The method of claim 2 wherein part of said additives, in powder form, is directly introduced into said turbulent mixer of said step (d).

15. The method of claim 1 wherein part of said additives, in powder or paste form, is directly introduced into said mixing extruder of said step (d).

16. The method of claim 2 wherein part of said additives, in powder or paste form, is directly introduced into said mixing extruder of said step (d).

17. The method of claim 13 wherein additionally part of said additives, in powder or paste form, is directly introduced into said mixing extruder of said step (d).

18. The method of claim 14 wherein additionally part of said additives, in powder or paste form, is directly introduced into said mixing extruder of said step (d).

19. The method of claim 1 wherein the duration of operation of the turbulent mixer is effective to partially decompose the elastomer.

20. The method of claim 1 wherein said premix ingredients comprise at least one additive selected from the group consisting of a crosslinking agent, catalyst, filler, inorganic pigment, organic dye, age protectant, lubricant, adhesive, anti-stick agent, foaming agent, and combinations thereof.

21. The method of claim 1 wherein all of said plasticizer oil is added in step (a).

22. The method of claim 1 wherein said premix ingredients include a vulcanizer and a catalyst.

* * * * *